Dec. 26, 1967 S. LAPOINTE 3,359,994
METHOD FOR BLEEDING A HYDRAULIC SYSTEM
Filed Sept. 20, 1965 2 Sheets-Sheet 1
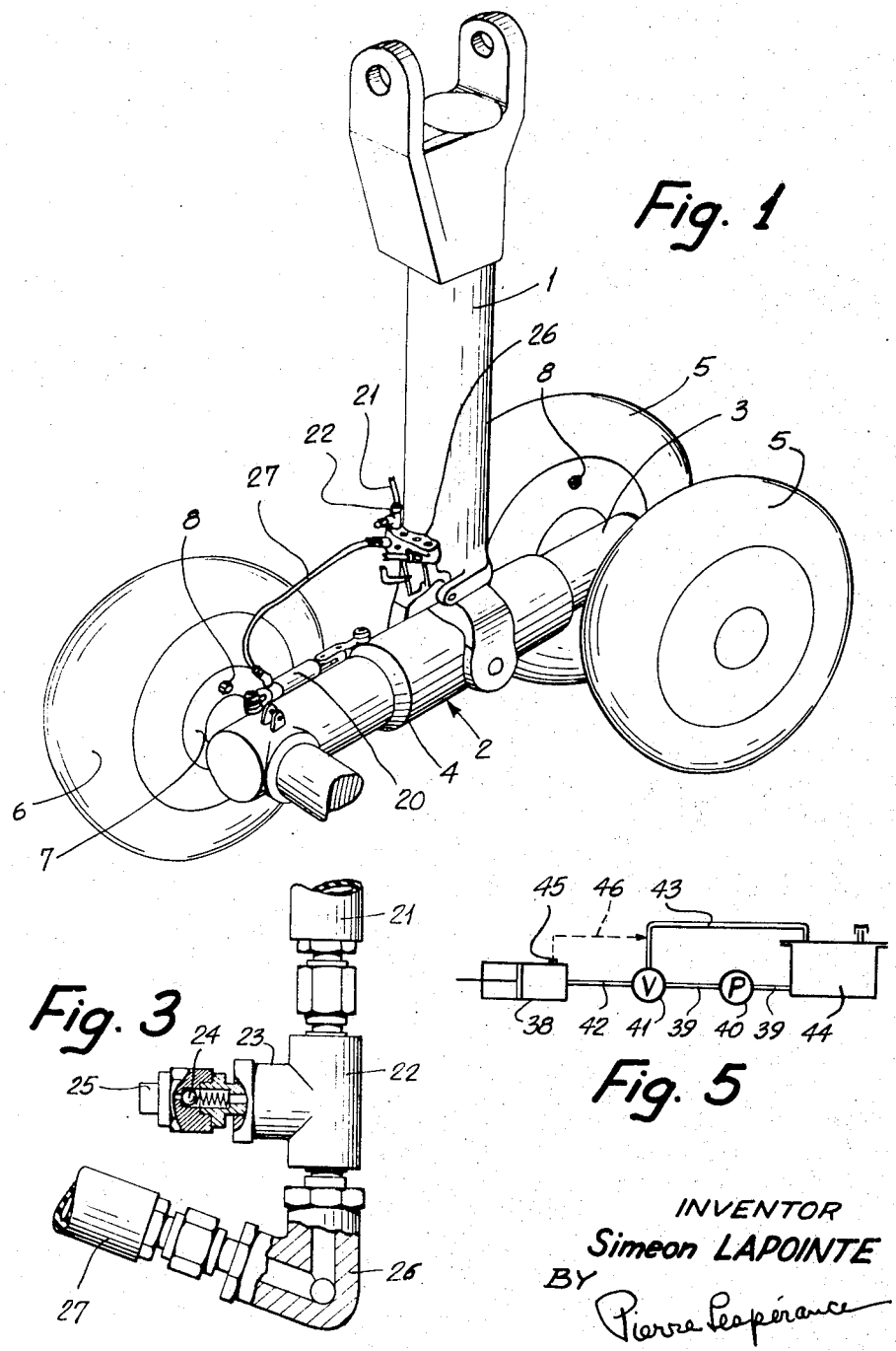
INVENTOR
Simeon LAPOINTE
BY
Pierre Lesperance
PATENT AGENT

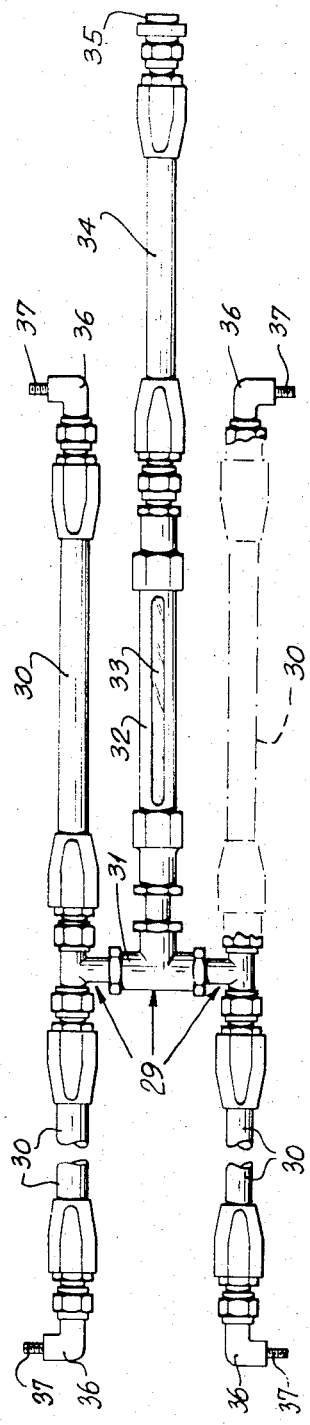
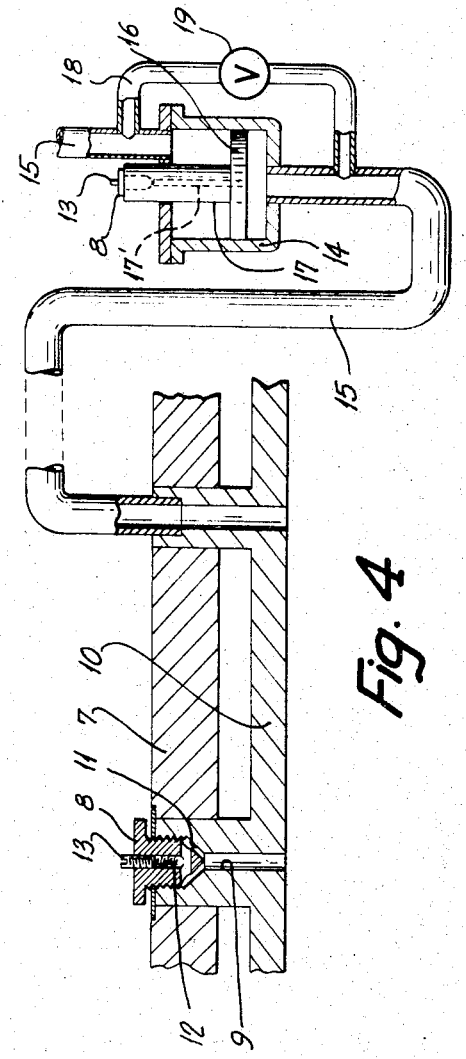

United States Patent Office 3,359,994
Patented Dec. 26, 1967

3,359,994
METHOD FOR BLEEDING A HYDRAULIC SYSTEM
Siméon Lapointe, 11764 James Morrice St., Montreal, Quebec, Canada
Filed Sept. 20, 1965, Ser. No. 488,680
6 Claims. (Cl. 137—15)

ABSTRACT OF THE DISCLOSURE

This invention relates to a method for bleeding a hydraulic motor connected in a hydraulic system including a reservoir, a feeding circuit and a return circuit between said motor and said reservoir, said motor having a normally closed bleeding orifice, said method comprising the steps of temporarily connecting an auxiliary hydraulic line to said bleeding orifice and to said return circuit and circulating hydraulic fluid through said motor, auxiliary line and return circuit back into said reservoir until substantially all gas entrapped in said motor is returned to said reservoir, wherein it becomes separated from the fluid and thereafter disconnecting said auxiliary hydraulic line and closing said bleeding orifice.

---

The present invention relates to a method and apparatus for bleeding hydraulic systems and, more specifically, the brake systems of aircraft.

In the conventional manner of bleeding aircraft wheel brakes, the fluid removed from the hydraulic system is thrown away. This constitutes an important waste because fluid, used in present-day aircraft hydraulic systems, is very expensive. Moreover, this hydraulic fluid attacks paint and rubber, and any fluid spillage may be detrimental to the aircraft tires and to the paint on the aircraft.

The general object of the present invention resides therefore in a method and means whereby practically all of the fluid bled from a hydraulic system, and more particularly from the hydraulic brake system of an aircraft, is returned directly to the reservoir of the same hydraulic system, or of a test rig, without spilling of the fluid and without contaminating the same. The method and means in accordance with the invention provide also a visual means of checking the quality of the bleeding function and result in much faster and positive bleeding operation than the conventional method.

Another important object of the present invention resides in the provision of an aircraft hydraulic system plumbing modified by installing a fluid returning fitting, equipped with a check valve, in a conveniently located line which performs a return function while the bleeding operation takes place, thereby to provide for quick and easy bleeding of the brake system and for automatically returning the bled fluid back into the general hydraulic system of the aircraft.

Another important object of the present invention resides in the provision of a method and means for bleeding a hydraulic system of the character described, which may be used for bleeding any part of the hydraulic system of an aircraft, or of hydraulic systems of other machines.

The method and means in accordance with the invention consist essentially in connecting either a temporary or permanent auxiliary hydraulic line between the bleeder port of a hydraulic component to be bled, and a connection in a hydraulic line in the return circuit of the hydraulic system, or directly to the reservoir of the aircraft system or test rig reservoir, and to circulate fluid through said circuit thus established, until practically all of the gas entrapped in the fluid, is carried back into the hydraulic reservoir, where the gas becomes separated from the fluid.

The foregoing and other important objects of the present invention will become more apparent during the following disclosure and by referring to the drawings, in which:

FIGURE 1 is a partial perspective view of the aircraft landing gear of a type such as found on DC-8 jet aircraft;

FIGURE 2 is a top plan view of the bleed harness used in accordance with the invention;

FIGURE 3 is a partial elevation, and partially in section, of the hydraulic circuit of the UNLOCK line, connected to the bogie swivel unlock cylinder, at the front lower end of the main landing gear shock strut cylinder, in accordance with FIGURE 1, said line being modified in accordance with the invention;

FIGURE 4 is a cross-section and schematic view of a hydraulic brake actuating cylinder, of one wheel of the landing gear and also showing the supply line and lock-out cylinder associated therewith; and FIGURE 5 is a schematic view of a hydraulic system showing the locations of the temporary or permanent auxiliary line connections used for bleeding.

Referring now more particularly to the drawings in which like reference characters indicate like elements throughout, FIGURE 1 shows, in somewhat schematic manner, one side of the main landing gear of a DC-8 aircraft comprising a shock strut 1, at the lower end of which is mounted a bogie assembly 2, made of a forward bogie 4 and aft bogie 3, the bogie assembly carrying a pair of rear wheels 5 and a pair of front wheels 6. Each wheel is equipped with a hydraulic brake assembly.

The wheel brake carrier 7 of each wheel is provided with the usual bleeding port closed by a bleeder valve screw 8. The bleeding orifice is shown at 9, in FIGURE 4, and is in communication with the inside of the brake actuating cylinder, partially shown at 10. The bleeding orifice 9 forms a tapered seat 11 for receiving the pointed tip of the bleeder valve screw 8 and said bleeder valve screw 8 is provided with an inverted T-shaped bore 12, the cross leg of which opens at the tapered end of the bleeder valve screw to be closed by seat 11 when bleeder valve screw 8 is screwed tight within bleeding orifice 9. The main leg of bore 12 extends to the outer end of the bleeder valve screw and is internally threaded and closed by screw plug 13.

For conventional bleeding of the brake actuating cylinder 10, screw plug 13 is first removed, a hose is connected to bore 12 and then bleeder valve screw 8 is slightly unscrewed to allow the fluid and air, entrapped in the fluid, to be discharged through the T bore 12.

FIGURE 4 shows also, in schematic manner, the usual lock-out cylinder 14 connected in the supply line 15 of the hydraulic brake actuating cylinder 10. Lock-out cylinder 14 has a piston 16 provided with a piston rod 17 having an axial bore 17' closed by bleeder valve screw 8 and screw plug 13. The supply line 15 is provided with a cylinder by-pass conduit 18 having a normally closed valve 19. A lock-out cylinder 14 is provided for each pair of wheel brakes, to prevent loss of fluid in the event of failure of one brake line, thus limiting the hydraulic fluid loss to that contained downstream of the brake lock-out cylinder.

Referring to FIGURE 1, the usual bogie swivel unlock cylinder 20 is mounted on forward bogie 4 and serves, when pressurized in the unlocked direction, to allow trailing action of the rear wheels 5 of the bogie located on the inside of the turn, when the aircraft is making a sharp turn on the ground.

The UNLOCK side of the bogie swivel unlock cylinder 20 is normally unpressurized during hangar maintenance; therefore, its UNLOCK line 21 is normaly connected to the hydraulic reservoir through the return side of the hydraulic system of the aircraft.

In accordance with the invention, as shown in FIGURE 3, the UNLOCK line 21 of the bogie swivel unlock cylinder 20 is fitted with a T-shaped conduit 22 series-connected in the UNLOCK line 21, and having a lateral branch 23 provided with a check valve 24 allowing entrance of bleeding fluid within the conduit 22, but preventing discharge of fluid therefrom.

The unconnected end of check valve 24 is normally closed by a screw cap 25. The T 22 is connected just above the manifold 26, in turn having a line connected at 27 to the UNLOCK side of the bogie swivel unlock cylinder 20. Thus, the T-shaped conduit 22 will be located along the shock strut 1, closed to the four bleeder valve screws 8 of the four wheel brakes.

A harness, shown in FIGURE 2, is used to constitute an auxiliary hydraulic line and is temporarily connected between the four bleeder valve screws 8 and the check valve 24 in the bogie swivel UNLOCK circuit, said circuit being normally connected to the fluid reservoir of the main hydraulic system of the aircraft.

The harness, shown in FIGURE 2, comprises an H-shaped rigid conduit 29, to the four branches of which are connected flexible hoses 30. The cross leg of the H-shaped conduit 29 is formed by a T coupling 31, to the lateral branch of which is connected a sight glass assembly 32 comprising a transparent tube 33 and to the other end of which is connected a flexible hose 34, in turn having at its outer end a connection 35, to be adapted and to be removably connected to the check valve 24 after screw cap 25 has been removed.

The outer ends of each of the four flexible hoses 30 are fitted with straight or L-shaped adaptors 36 terminated by an externally threaded nipple 37, of reduced diameter, adapted to be screwed into the bore 12 of bleeder valve screw 8, to replace the screw plug 13 of the bleeder valve screws 8 of each wheel brake. The T-shaped conduit 22 with its check valve 24 and screw cap 25 are permanently installed in the UNLOCK line 21 of the bogie swivel unlock cylinder 20, as previously described.

The bleeding procedure for all four brakes is as follows:

The brake lock-out cylinder by-pass valves 19 are opened and parking brakes are set to "on." The screw plug 13 of all four brakes are removed and adaptors 36 are screwed in place thereof, said adaptors having been previously disconnected from flexible hoses 30 of harness shown in FIGURE 2. Then, the hoses 30 are re-connected to the adaptors 36 and the connection 35 of the return hose 34 of the harness is connected to the check valve 24 after removal of screw cap 25. Thus, the harness, shown in FIGURE 2, constitutes an auxiliary line between the bleeding ports of the four brakes and the return circuit of the aircraft hydraulic system, said return circuit being the UNLOCK line of the bogie swivel unlock cylinder, which is normally internally connected to the fluid reservoir.

The brake bleeder valve screws 8 are opened one at a time and left open while hydraulic fluid is caused to be circulated by the pump of the hydraulic system through the associated hydraulic brake actuating cylinder being bled. The fluid is thus circulated until all the air in the fluid is returned to the reservoir of the hydraulic system. This is shown when air free fluid flows through the sight glass 33.

After pressurizing the hydraulic system, the bleeder valve screw 8 is screwed back; the procedure is repeated for each brake in succession; the harness, shown in FIGURE 2, is then removed and the screw plugs 13 are screwed back in position in bleeder valve screws 8. The blanking cap 25 is screwed back into position on the check valve 24; then, blanking caps are screwed on connection 35 and adaptor nipples 37 of the bleeding harness.

The aircraft pump has been found to be powerful enough to circulate the hydraulic fluid at sufficient velocity to carry back into the fluid reservoir all of the air or other gas entrapped in the fluid.

The lock-out cylinders 14 may be bled in the same manner by using harness 28; the adaptors 36 are connected to the bleeder valve screws 8 of piston rods 17 of the lock-out cylinders and harness connection 35 connected to the bogie unlock line bleed connection at check valve 24. Fluid is successively circulated through the lock-out cylinders 14 with their associated by-pass valves 19 opened, until air-free fluid appears through the sight glass. Then, the harness is disconnected, the screw plugs 13 are put back in position together with screw cap 25, and the lock-out cylinder by-pass valves 19 are closed.

If less than four wheel brakes are being bled, the unused hoses 30 are disconnected from the H-shaped coupling 29 and the open branches of the latter are capped. Any other sub-system or component, such as the wing flap cylinders of the hydraulic system of an aircraft, or of any other machine, may be bled in the above-noted manner. As shown schematically in FIGURE 5, the method is applicable to a hydraulic system comprising a hydraulic motor such as hydraulic cylinder 38, a feeding circuit 39 permanently or temporarily mounted and including a hydraulic pump 40, or other device for circulating the fluid under pressure, a control valve 41, a reservoir 44 which may be pressurized, and a return circuit 43, permanently or temporarily mounted, the return circuit 43 being connected to valve 41 and the reservoir, while the feeding circuit 39 is connected to the reservoir and valve 41.

The hydraulic actuating cylinder 38 has a normally closed bleeding orifice 45 and the method in accordance with the invention consists in temporarily connecting an auxiliary hydraulic line 46 to the return circuit 43 and to the bleeding opening 45 and circulating fluid through the feeding circuit into the hydraulic actuating cylinder 38 and back to the reservoir 44 through the auxiliary line 46 and return circuit 43 at such a rate and for a time sufficient that substantially all of the air entrapped in the fluid is carried back into the reservoir 44, where it will become separated from the fluid.

While a preferred embodiment in accordance with the invention has been illustrated and described, it is understood that various modifications have been illustrated and described without departing from the scope of the appended claims.

What I claim is:

1. A method for bleeding a hydraulic motor connected in a hydraulic system including a reservoir, a feeding circuit and a return circuit between said motor and said reservoir, said motor having a normally closed bleeding orifice, said method comprising the steps of temporarily connecting an auxiliary hydraulic line to said bleeding orifice and to said return circuit, circulating fluid through said motor, auxiliary line and return circuit into said reservoir until substantially all gas entrapped in said motor is returned to said reservoir wherein it becomes separated from said fluid, and thereafter disconnecting said auxiliary hydraulic line, and closing said bleeding orifice.

2. A method for bleeding a hydraulic motor connected in a hydraulic system including a reservoir, a feeding circuit and a return circuit between said motor and said reservoir, said motor having a normally closed bleeding orifice, comprising the steps of temporarily connecting an auxiliary hydraulic line to said bleeding orifice and to said return circuit and circulating hydraulic fluid through said feeding circuit, said motor, said auxiliary line and said return circuit back into said reservoir at a sufficient speed to carry substantially all gas entrapped in said motor and circuits back into said reservoir, whereby said gas becomes separated from said fluid, and thereafter disconnecting said auxiliary line, and closing said bleeding orifice.

3. A method for bleeding a hydraulic motor connected in a hydraulic system including a reservoir, a feeding circuit and a return circuit between said motor and said reservoir, said motor having a bleeding orifice, comprising the steps of temporarily connecting an auxiliary hydraulic line having a series-connected sight glass, to said bleeding orifice and to said return circuit, circulating hydraulic fluid through said feeding circuit, motor, said auxiliary line and said return circuit back into said reservoir at a sufficient speed to carry gas entrapped in said motor and circuits back into said reservoir and until fluid seen in said sight glass is substantially gas-free and thereafter disconnecting said auxiliary line, and closing said bleeding orifice.

4. A method for bleeding a hydraulic motor connected in a hydraulic system including a valve, a hydraulic line connected to said motor and to said valve, means feeding hydraulic fluid under pressure, a pressure line connected to said valve and to said means, a reservoir connected to said means, and a return line connected to said valve and to said reservoir, said motor having a normally closed bleeding orifice, said method comprising the steps of temporarily connecting an auxiliary hydraulic line to said bleeding orifice and to said return line and operating said means to supply fluid under pressure to said motor until substantially all gas entrapped in the motor is carried by said fluid back into said reservoir, wherein said gas becomes separated from said fluid, and thereafter disconecting said auxiliary hydraulic line, and closing said bleeding orifice.

5. A method for bleeding the hydraulic cylinders of the wheel brakes of an aircraft landing gear, said cylinders having a normally closed bleeding orifice and connected in a hydraulic system including a feeding circuit connected to said cylinders, a reservoir connected to said feeding circuit, a return circuit connected to said reservoir and a fluid line at least temporarily connected to said return circuit, said method comprising the steps of temporarily connecting an auxiliary hydraulic line to said bleeding orifices and to said fluid line and circulating fluid through said feeding circuit, said motor, said auxiliary line, said fluid line and said return circuit back into said reservoir until substantially all gas entrapped in the cylinders is carried back into said reservoir wherein said gas becomes separated from said fluid, and thereafter disconnecting said auxiliary line and closing said bleeding orifices.

6. A method as claimed in claim 5, wherein said aircraft landing gear comprises a bogie and a bogie swivel unlock cylinder, a hydraulic unlock line for said unlock cylinder, said fluid line consisting of said last-named hydraulic unlock line.

References Cited
UNITED STATES PATENTS

| | | | |
|---|---|---|---|
| 2,295,539 | 9/1942 | Beach | 188—152 |
| 2,644,548 | 7/1953 | Schiemann | 188—152 |
| 2,653,564 | 9/1953 | Benefield | 116—118 |
| 2,771,093 | 11/1956 | Wilson | 137—614.17 |
| 2,930,552 | 3/1960 | Hartel | 244—105 |
| 3,154,087 | 10/1964 | Beaver | 137—15 |

HENRY T. KLINKSIEK, *Primary Examiner.*